United States Patent
Chotimongkol et al.

(10) Patent No.: US 8,548,805 B2
(45) Date of Patent: Oct. 1, 2013

(54) SYSTEM AND METHOD OF SEMI-SUPERVISED LEARNING FOR SPOKEN LANGUAGE UNDERSTANDING USING SEMANTIC ROLE LABELING

(71) Applicant: AT&T Corp., New York, NY (US)

(72) Inventors: Ananlada Chotimongkol, Pittsburgh, PA (US); Dilek Z. Hakkani-Tur, Denville, NJ (US); Gokhan Tur, Denville, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

(21) Appl. No.: 13/684,939

(22) Filed: Nov. 26, 2012

(65) Prior Publication Data

US 2013/0085756 A1    Apr. 4, 2013

Related U.S. Application Data

(63) Continuation of application No. 11/290,859, filed on Nov. 30, 2005, now Pat. No. 8,321,220.

(51) Int. Cl.
*G10L 15/06* (2013.01)

(52) U.S. Cl.
USPC ............. 704/243; 704/257; 704/277; 704/10; 704/4; 704/240; 704/9

(58) Field of Classification Search
USPC ................ 704/243, 9, 4, 1, 10, 240, 257, 277
See application file for complete search history.

(56) References Cited

U.S. PATENT DOCUMENTS

| | | | | |
|---|---|---|---|---|
| 5,671,425 A | * | 9/1997 | Suematsu | 704/9 |
| 6,278,973 B1 | * | 8/2001 | Chung et al. | 704/257 |
| 6,374,210 B1 | * | 4/2002 | Chu | 704/9 |
| 6,912,499 B1 | * | 6/2005 | Sabourin et al. | 704/243 |
| 7,092,888 B1 | * | 8/2006 | McCarthy et al. | 704/277 |
| 7,139,698 B1 | * | 11/2006 | Gorin et al. | 704/10 |
| 2002/0059289 A1 | * | 5/2002 | Wenegrat et al. | 707/102 |
| 2002/0128814 A1 | * | 9/2002 | Brandon et al. | 704/1 |
| 2004/0204940 A1 | * | 10/2004 | Alshawi et al. | 704/240 |
| 2005/0278164 A1 | * | 12/2005 | Hudson et al. | 704/4 |
| 2006/0080101 A1 | * | 4/2006 | Chotimongkol et al. | 704/257 |

* cited by examiner

Primary Examiner — Michael Colucci

(57) ABSTRACT

A system and method are disclosed for providing semi-supervised learning for a spoken language understanding module using semantic role labeling. The method embodiment relates to a method of generating a spoken language understanding module. Steps in the method comprise selecting at least one predicate/argument pair as an intent from a set of the most frequent predicate/argument pairs for a domain, labeling training data using mapping rules associated with the selected at least one predicate/argument pair, training a call-type classification model using the labeled training data, relabeling the training data using the call-type classification model and iteratively several of the above steps until training set labels converge.

20 Claims, 2 Drawing Sheets

SYSTEM AND METHOD OF SEMI-SUPERVISED LEARNING FOR SPOKEN LANGUAGE UNDERSTANDING USING SEMANTIC ROLE LABELING

PRIORITY INFORMATION

The present application is a continuation of U.S. patent application Ser. No. 11/290,859, filed Nov. 30, 2005, the content of which is incorporated herein by reference in its entirety.

BACKGROUND OF THE INVENTION

1. Field of the Invention

The present invention relates to a system and method of semi-supervised learning for spoken language understanding using semantic role labeling.

2. Introduction

The present invention relates to natural language dialog systems. A spoken dialog system includes some basic components such as an automatic speech recognition module, a spoken language understanding module and a speech generation module such as a text-to-speech module. 1 is a functional block diagram of an exemplary natural language spoken dialog system 100. Natural language spoken dialog system 100 may include an automatic speech recognition (ASR) module 102, a spoken language understanding (SLU) module 104, a dialog management (DM) module 106, a spoken language generation (SLG) module 108 and a text-to-speech (TTS) module 110 or other type of module for generating speech.

ASR module 102 may analyze speech input and may provide a transcription of the speech input as output. SLU module 104 may receive the transcribed input and may use a natural language understanding model to analyze the group of words that are included in the transcribed input to derive a meaning from the input. The role of DM module 106 is to receive the derived meaning from the SLU 104 module and generate a natural language response to help the user to achieve the task that the system is designed to support. DM module 106 may receive the meaning of the speech input from SLU module 104 and may determine an action, such as, for example, providing a response, based on the input. SLG module 108 may generate a transcription of one or more words in response to the action provided by DM 106. TTS module 110 may receive the transcription as input and may provide generated audible speech as output based on the transcribed speech. There are variations that may be employed. For example, the audible speech may be generated by other means than a specific TTS module as shown.

Thus, the modules of system 100 may recognize speech input, such as speech utterances, may transcribe the speech input, may identify (or understand) the meaning of the transcribed speech, may determine an appropriate response to the speech input, may generate text of the appropriate response and from that text and may generate audible "speech" from system 100, which the user then hears. In this manner, the user can carry on a natural language dialog with system 100. Those of ordinary skill in the art will understand the programming languages and means for generating and training ASR module 102 or any of the other modules in the spoken dialog system. The present invention focuses primarily on the spoken language understanding module but may apply to other components as well.

Spoken language understanding aims to extract the meaning of the speech utterances. In the last decade, a variety of practical goal-oriented spoken dialog systems (SDS) have been built for limited domains, especially for call routing. These systems aim to identify intent found within the speech of people, expressed in natural language, and take the appropriate action to satisfy the request. In such systems, typically, the speaker's utterance is first recognized using ASR 102. Then, the intent of the speaker is identified from the recognized sequence, using the SLU component 104. Finally, the DM 106 interacts with the user in a natural way and help the user to achieve the task that the system is designed to support. As an example, consider the utterance "I have a question about my bill." Assuming that the utterance is recognized correctly, the corresponding intent (call-type) would be Ask (Bill). The action that needs to be taken depends on the DM 106. It may ask the user to further specify the problem or route the call to the billing department.

For call-type classification, one can use a domain-dependent statistical approach as in the previous work. But this approach has some serious drawbacks. First, training statistical models for intent classification requires large amounts of labeled in-domain data, which is very expensive and time-consuming to prepare. If rule-based methods are used for these tasks, this requires some human expertise, therefore has similar problems. Moreover, the preparation of the labeling guide (i.e., designing the intents) for a given spoken language understanding task is also time-consuming and involves non-trivial design decisions. These decisions depend on the expert who is designing the task structure and the frequency of the intents for a given task. Furthermore, one expects the intents to be clearly defined in order to ease the job of the classifier and the human labelers.

Another issue is the consistency between different tasks. This is important for manually labeling the data quickly and correctly and making the labeled data re-usable across different applications. For example in most applications, utterances like "I want to talk to a human not a machine" appear and they can be processed similarly.

On the other hand, in the computational linguistics domain, task independent semantic representations have been proposed since the last few decades. Two notable studies are the known FrameNet and PropBank projects. This disclosure focuses on the Propbank project, which aims at creating a corpus of text annotated with information about basic semantic propositions. Predicate/argument relations are added to the syntactic trees of the existing Penn Treebank, which is mostly grammatical written text. Very recently, the PropBank corpus has been used for semantic role labeling (SRL) at the CoNLL-2004 as the shared task. SRL aims to put "who did what to whom" kind of structures to sentences without considering the application using this information. More formally, given a predicate of the sentence, the goal of SRL is to identify all of its arguments and their semantic roles.

The relationship between the arguments of the predicates in a sentence and named entities have been previously exploited by those who have used SRL for information extraction.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention addresses the deficiencies in the prior art by extending the idea of using SRL for information extraction. The inventors propose a spoken language understanding approach based on task-independent semantic parsing of the utterances. The goal is to extract the predicates and the associated arguments from spoken language and design mapping rules to map them to some output representation which the DM can work with. This representation can be the same as or more sophisticated than the intents motivated by the possible routes in the application. The inventors propose an iterative approach using the automatically labeled utterances (by the mapping rules) as the seed training data for intent classification. This process requires no manual labeling or labeling guide preparation is required and the only human intervention is during the mapping rule design step, and it is miniscule compared to the traditional approach.

In a goal-oriented spoken dialog system, the major aim of language understanding is to classify utterances into one or more of the pre-defined intents and extract the associated named entities. Typically, the intents are designed by a human expert according to the application domain. Furthermore, these systems are trained using large amounts of manually labeled data. In this paper, we propose a semisupervised spoken language understanding approach based on the task-independent semantic role labeling of the utterances. The goal is to extract the predicates and the associated arguments from spoken language by using semantic role labeling and determine the intents based on these predicate/argument pairs. The iterative approach uses the automatically labeled utterances as the seed training data for intent classification.

The inventors have evaluated this understanding approach using AT&T spoken dialog system used for customer care. It is shown that the semantic parses obtained without using any syntactically or semantically labeled in-domain data can represent the semantic intents without a need for intent design and labeling phases. Using this approach on automatic speech recognizer transcriptions, 86.5% of the performance of a classification model trained with thousands of labeled utterances was achieved.

A system, computer-readable medium and method are disclosed for providing semi-supervised learning for a spoken language understanding module using semantic role labeling. The method embodiment relates to a method of generating a spoken language understanding module. Steps in the method comprise selecting at least one predicate/argument pair as an intent from a set of the most frequent predicate/argument pairs for a domain, labeling training data using mapping rules associated with the selected at least one predicate/argument pair, training a call-type classification model using the labeled training data, re-labeling the training data using the call-type classification model and iteratively several of the above steps until training set labels converge. Preferably, the steps of training the call-type classification model and re-labeling the training data using the call-type classification model are repeated until convergence.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
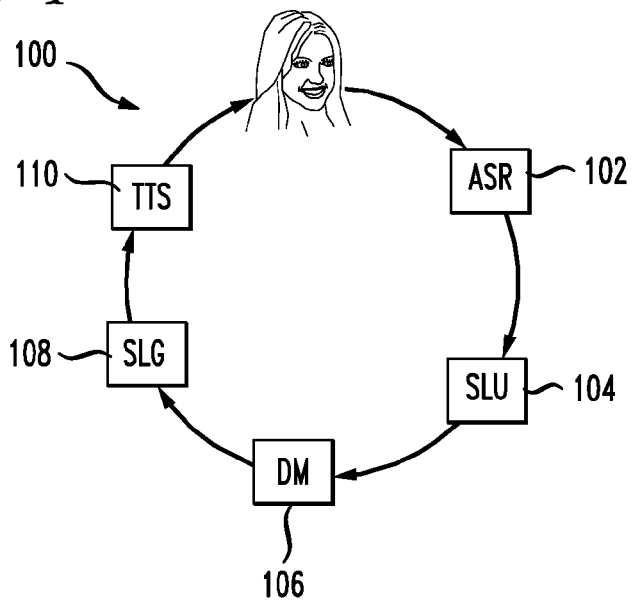
FIG. 1 illustrates the basic components for a spoken dialog system.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The task of semantic role labeling will be discussed in more detail as well as the inventive approach using semantic role labels for natural language understanding. The inventors also discuss their experimental results using the AT&T VoiceTone spoken dialog system data.

In the CoNLL-2004 shared task, semantic role labeling is defined as the task of analyzing the propositions expressed by some target verbs of the sentence. See, X. Carreras and L. Marquez, "Introduction to the CoNLL-2004 shared task: Semantic role labeling," in Proceedings of the CoNLL, Boston, Mass., May 2004, incorporated herein by reference. In particular, the goal is to extract all the constituents which fill a semantic role of a target verb. Typical semantic arguments include Agent, Patient, Instrument, etc. and also adjuncts such as Locative, Temporal, Manner, Cause, etc. In the PropBank corpus, these arguments are given mnemonic names, such as Arg0, Arg1, Arg-LOC, etc. For example, for the sentence "I have bought myself a blue jacket from your summer catalog for twenty five dollars last week," the agent (buyer, or Arg0) is I, the predicate is buy, the thing bought (Arg1) is a blue jacket, the seller or source (Arg2) is from your summer catalog, the price paid (Arg3) is twenty five dollars, the benefactive (Arg4) is myself, and the date (ArgM-TMP) is last week.

Semantic role labeling can be viewed as a multi-class classification problem. Given a word (or phrase) and its features, the goal is to output the most probable semantic role label. As it can be seen from the above incorporated paper, for this purpose, most researchers have used statistical classifiers with various syntactic and semantic features. The methods have ranged from Support Vector Machines (SVM) to Transformation-Based Error-Driven Learning to Memory-Based Learning. Most approaches have focused on extracting the most useful features for superior performance and have seen the classification algorithms as black boxes. PropBank corpus includes the semantic roles as well as other linguistic information, which might be useful for this task, such as part of speech tags of the words, named entities, and syntactic parses of the sentences.

The inventors preferably use a feature set similar to that used by Hacioglu et al., "Semantic role labeling by tagging syntactic chunks," in Proceedings of the CoNLL, Boston, Mass., May 2004, incorporated herein by reference. Other feature sets may be used as well. In the Hacioglu et al. approach, all features have contextual counterparts. For example, the preceding and following two words, or predicted semantic roles are also used as features. Furthermore, instead of labeling the semantic role of each word, the inventors have also employed the phrase-based labeling approach, where only the head words of phrases are labeled. This assumes that all words in a phrase have the same semantic role. Each phrase is represented with the features of the head word. This reduces the number of tokens that have to be tagged and enables the contextual features to span a larger portion of the sentence. The features include token-level features (such as the current (head) word, its part-of-speech tag, base phrase type and position, etc.), predicate-level features (such as the predicate's lemma, frequency, part-of-speech tag, etc.) and argument-level features which capture the relationship between the token (head word/phrase) and the predicate (such as the syntactic path between the token and the predicate, their distance, token position relative to the predicate, etc.).

Semantic role labeling of spoken utterances is a challenge just by itself, because of various reasons such as:

Noisy speech recognition: State of the art ASR systems operate with a word error rate of around 25%, that is they misrecognize one out of every four words. This represents is a challenge for robust SRL.

Ungrammatical utterances with disfluencies: Unlike the newspaper articles in the PropBank corpus, the inventors expect the input utterances to be more casual and shorter, but on the other hand very frequently ungrammatical and including disfluencies, such as repetitions, corrections, etc.

Open domain: Since the same SRL methods are going to be used for various SDS applications, such as customer care systems, automobile interaction systems, etc., one expects the SRL to be robust to domain changes, and usable for many different applications with an acceptable performance.

In the CoNLL-2004 shared task, researchers have found that syntactic information, such as part of speech (POS) tags or syntactic parses and semantic information, such as named entities, are extremely useful for SRL. Thus, the inventors need to syntactically preprocess an utterance and extract named entities before semantically parsing it. This requires the feature extraction step (e.g., part of speech tagging) to face the above problems, as well.

In order to build a domain-independent spoken language understanding system, the inventors propose using the predicates and their arguments provided by the semantic role labeling of utterances. Once an utterance is semantically parsed, the inventors propose extracting the predicates and the related arguments and using these predicates and some certain arguments as the intents regardless of the application domain. This approach ensures the consistency across various domains and eases the job of the SDS design, which includes the determination of intents and the corresponding dialog flow. This also means that there is no need for in-domain data manually labeled with intents or a labeling guide to be used by human labelers. If some amount of in-domain data labeled with semantic roles is provided this would improve the performance of semantic role labeling, though it is not critical.

While building the application, the human expert is provided with the most frequent predicate/argument pairs for the domain. The expert can then select certain predicate/argument pairs as intents by writing some mapping rules. For instance, consider a spoken language understanding application from a retail domain. One intent would be placing an order. For example, the utterance "I would like to place an order" would be mapped to the intent Place(Order). This is similar to the process of mapping a sentence to its logical form known as semantic interpretation using semantic role labels. Semantically equivalent predicate/argument pairs such as make/order and place/order may be grouped while designing the intents.

Figure 2:
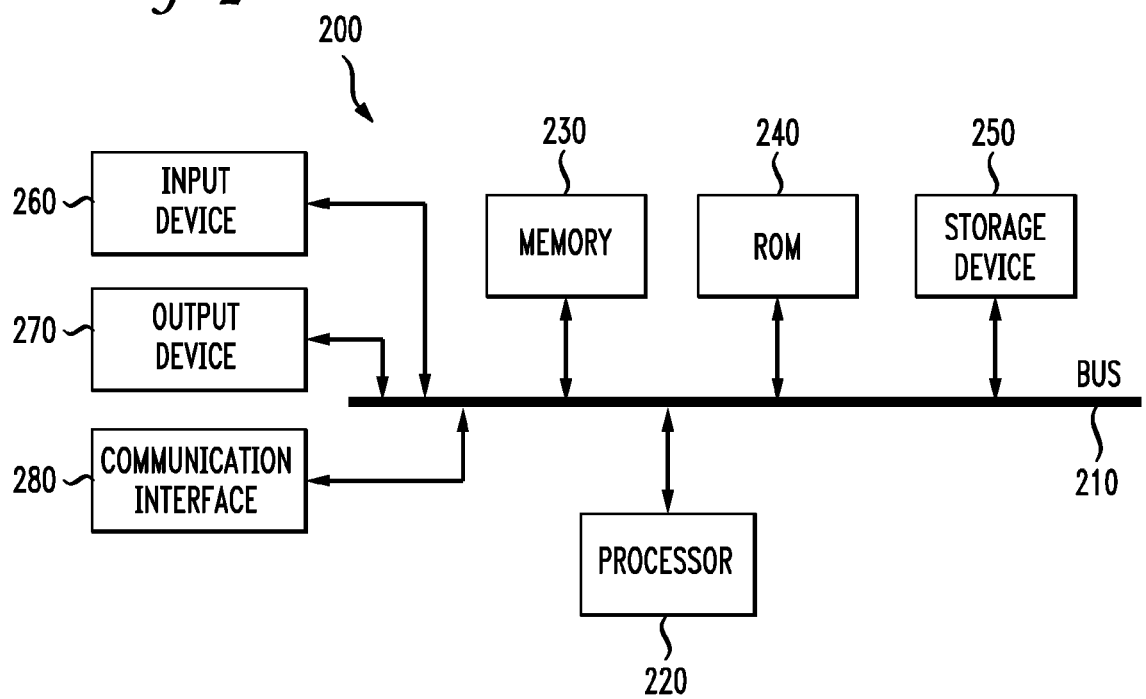
FIG. 2 illustrates an example system embodiment of the invention.

One embodiment of the invention relates to a system for performing semi-supervised learning for an SLU module. FIG. 2 illustrates the basic components of an exemplary processing device 200 which may implement a user workstation or server consistent with the principles of the invention. Processing device 200 may be, for example, a personal computer (PC), a portable computing device, a computer server or any other type of processing device. Processing device 200 may include a bus 210, a processor 220, a memory 230, a read only memory (ROM) 240, a storage device 250, an input device 260, an output device 270, and a communication interface 280. Bus 210 may permit communication among the components of the computing device. Processor 220 may include at least one conventional processor or microprocessor that interprets and executes instructions. Memory 230 may be a random access memory (RAM) or another type of dynamic storage device that stores information and instructions for execution by processor 220. Memory 1106 may also store temporary variables or other intermediate information used during execution of instructions by processor 220. ROM 240 may include a conventional ROM device or another type of static storage device that stores static information and instructions for processor 220. Storage device 250 may include any type of media, such as, for example, magnetic or optical recording media and its corresponding drive. Input device 260 may include one or more conventional mechanisms that permit a user to input information to system 200, such as a keyboard, a mouse, a pen, a voice recognition device, a microphone, a headset, etc. Output device 270 may include one or more conventional mechanisms that output information to the user, including a display, a printer, one or more speakers, a headset, or a medium, such as a memory, or a magnetic or optical disk and a corresponding disk drive. Communication interface 280 may include any transceiver-like mechanism that enables a computing device to communicate via a network or in a wireless environment. For example, communication interface 280 may include a modem, or an Ethernet interface for communicating via a local area network (LAN). Alternatively, communication interface 280 may include other mechanisms for communicating with other devices and/or systems via wired, wireless or optical connections.

Processing device 200 may perform such functions in response to processor 220 executing sequences of instructions contained in a computer-readable medium, such as, for example, memory 230, a magnetic disk, or an optical disk. Such instructions may be read into memory 230 from another computer-readable medium, such as storage device 250, or from a separate device via communication interface 280.

Figure 3:
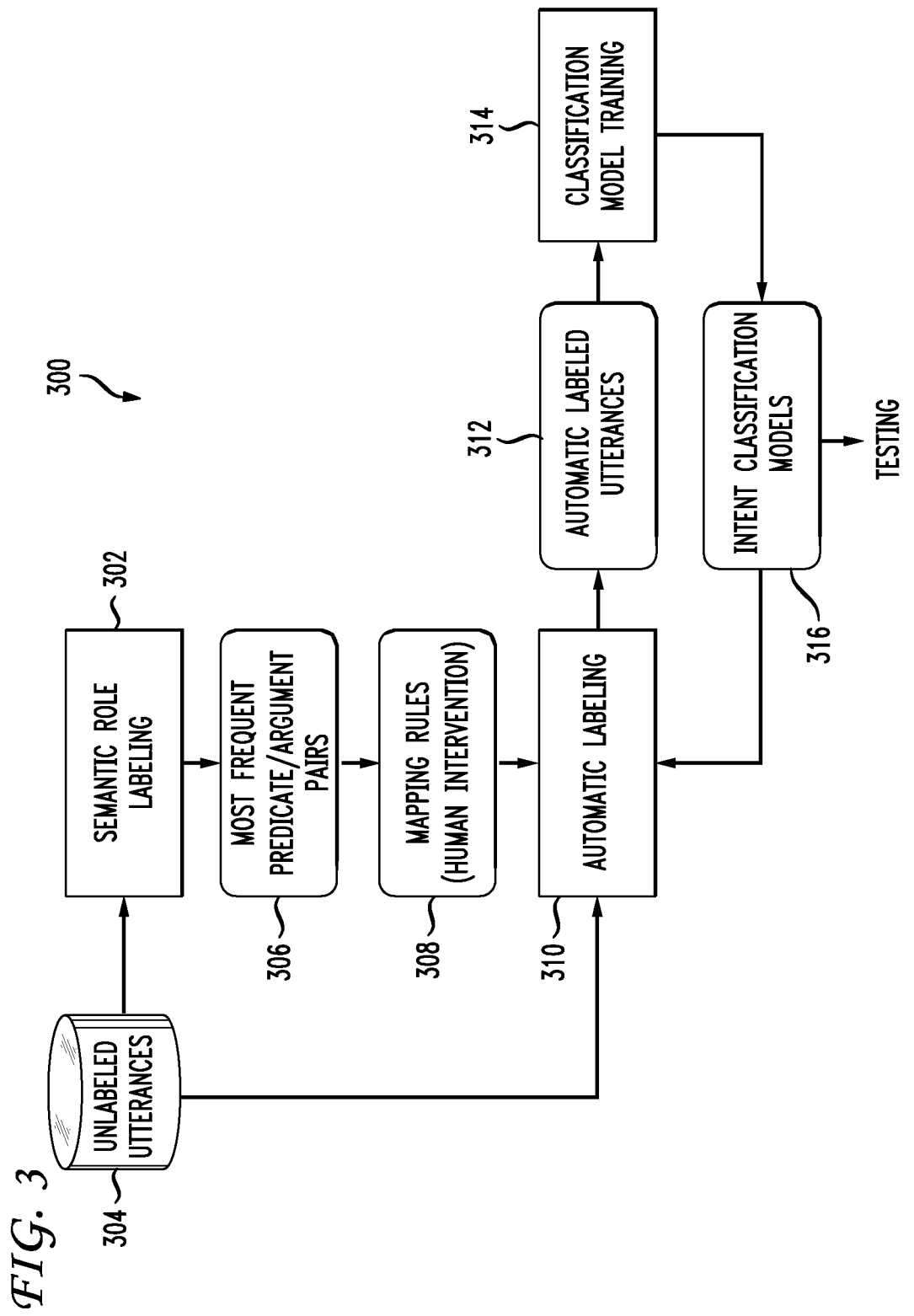
FIG. 3 illustrates an example semi-supervised spoken language understanding approach.

Having introduced the basic features of a system embodiment. One issue with this approach is caused by utterances with no predicates, such as the utterance account balance. Another problem is that, due to noisy ASR output, the utterance can not be parsed appropriately. In order to handle such cases, the inventors propose an iterative approach as follows: The training data is first labeled using the mapping rules. Then a call-type classification model can be trained using the portion of the training data automatically labeled by the mapping rules. Using this model, the very same training data can be automatically re-labeled and the model can be retrained, until the training set labels converge. This iterative process is depicted in FIG. 3, which illustrates some of the features of the method embodiment of the invention. Intuitively, using the iterative method, the model can capture more features related to the call-types and hence perform better. For example, before the first round, the utterance "I'd like to know my account balance" would be labeled as Know(Balance) if there is such a rule for the predicate/argument pair know/balance. When a classification model is trained with such labeled utterances, other similar utterances, such as account balance, may be labeled automatically with the same call-type, hence increase the amount and variability of the utterances in the training data. FIG. 3 shows steps in a method of generating a spoken language understanding module. Unlabeled utterances 304 are provided to a module that performs semantic role labeling (302). A module selects at least one predicate/argument pair as an intent from a set of the most frequent predicate/argument pairs for a domain (306). Mappling rules may be applied which in one aspect may require human intervention 308. A module labels training data using mapping rules associated with the selected at least one predicate/argument pair (310) to generate automatic labeled utterances 312. A module trains a call-type classification model using the labeled training data (314). The method also comprises re-labeling the training data using the call-type classification model and iteratively processing the labeling and training steps until training set labels converge. Intent classification models (316) may be used in this iterative process.

Next the inventors discuss the experiments and results towards a task-independent SLU. First, performance of the Semantic Role Labeling system built using the 2004 PropBank corpus is presented as well as experimental results on using SRL for SLU. A semantic role labeling classifier was trained as described above using the PropBank corpus following the CoNLL-2004 shared task. This is the Wall Street Journal part of the Penn Treebank corpus. Training set is formed from sections of the corpus (such as sections 15-18) and test set from another section (such as section 20). An exemplary number of semantic roles is 79. Boostexter with 2000 iterations is the preferred classifier although others may be used. As the evaluation criteria, the inventors used the F-1 metric as defined in the CoNLL-2004 shared task for each semantic role (which requires both the boundary and the label to be correct).

TABLE 1

Data Set Characteristics

|  | App 1 | App 2 |
|---|---|---|
| Training Set | 10,000 utt. | 29,577 utt |
| Test Set | 5,056 utt. | 5,537 utt. |
| No. call-types | 34 | 96 |
| Avg. utt. length | 9.2 words | 9.9 words |
| ASR Word Accuracy (Test) | 70.3% | 73.8% |

TABLE 2

Most frequent predicates for the purchase intent from a retail domain customer care application

| Predicate | Percent | Example |
|---|---|---|
| Place | 79% | Place an order |
| Order | 9% | Order a jacket |
| Make | 4% | Make and order |
| Put | 1% | Put in an order |

For the experiments, the inventors used data from the retail and pharmaceutical domains, collected by the AT&T VoiceTone spoken dialog system used for customer care. Users usually call the retail system to purchase or return items, track, change, or cancel their orders, or ask about store locations, hours, etc. The other system is called mostly for refilling drugs, ordering new prescriptions, etc. It has 3 times as many call-types and training data utterances as the first one. Table 1 summarizes the characteristics of these data sets.

As the POS and NE taggers, the inventors have used simple HMMbased taggers. In order to train the POS tagger, the inventors used the Penn TreeBank corpus training set. For the NE tagger, the MUC data was used. Collins' parser (See, M. Collins, "Head-Driven Statistical Models for Natural Language Parsing", Ph.D. Thesis, University of Pennsyolvania, 1999) and Buchholz's chunklink script (See, http://ilk.kub.nl/~sabine/chunklink/chunklink 2-2-2000 for conll.pl) were used to extract information from the parse trees. To identify the predicates, the inventors used a rule: A word is a predicate if its POS tag is a verb (except the verbs be and have, in order to be consistent with PropBank corpus). A table look up was used to identify the predicate lemma (base form).

In order to evaluate performance of SRL on this task, the inventors manually annotated 285 manually transcribed utterances. They include 645 predicates (2.3 predicates/utterance). First, the inventors have computed recall and precision rates for evaluating the predicate identification performance. The precision is found to be 93.0% and recall is 91.2%. Vast majority of the errors are caused by the POS tagger, which is trained on newspaper domain. A typical example is the word "please," which is very frequent in customer care domain but erroneously tagged as verb in most cases, since it is labeled erroneously or frequently occurs as a verb in the Penn TreeBank. More than 90% of false alarms for predicate extraction are due to this word. Most of the false rejections are due to disfluencies and ungrammatical utterances. An example would be the utterance I'd like to order place an order, where the predicate place is tagged as noun erroneously probably because of the preceding verb order.

The inventors have also evaluated the argument labeling performance. A stricter measure than the CoNLL-2004 shared task was used. In the evaluation, the inventors call the labeling as correct if both the boundary and the role of all the arguments of a predicate are correct. In the test set, the inventors have found out that the SRL tool correctly tags all arguments of 57.6% of the predicates. The errors are mostly due to disfluencies or sentence fragments (25%), missing some arguments (25%), assigning wrong argument labels (10%) and false alarms for predicate extraction (7%).

As the next set of experiments, the inventors have only focused on one intent, namely Make(Order), from the first application, which covers utterances with purchase intents, such as "I would like to order a jacket." In the corpus, there are 7,765 utterances with that intent (about half of all utterances). The inventors were able to use 7,734 of them, since one could not parse the remaining 0.4% due to fragmented and cut-off sentences, or several sentences joined into one sentence. For this set of utterances, the distribution of the most frequent predicates are given in Table 2. For that call-type, one predicate (i.e., place) is very frequent, and there is a list of infrequent predicates.

After these experiments, instead of considering a single call-type, the inventors used all utterances from this application. The most frequent predicate/argument pairs are given in Table 3. For each pair, p, the inventor compute its relation with the associated call-type, c, designed by a human user experience expert, using P(p/c) and P(c/p). Note that for each predicate/argument pair, there is a single call-type with a very high probability, P(c/p), but a call-type may be represented by multiple pairs.

Next, the inventors tried to perform call classification without any labeled in-domain training data. The inventors manually grouped the most frequent predicate/argument pairs in the training data into call-types, and computed the accuracy of call classification on the test set using these. Table 4 presents the results of the call classification on the test set. Results are provided using both human transcriptions and ASR outputs in order to test the robustness of our approach to noisy ASR output. Two rule sets, R1 and R2 were tried. R2 is used for setting an upper bound with this approach where all predicate/argument pairs found in the training data are mapped to the most frequent call-types which have those pairs. The more realistic scenario is using R1, which consists of only the most frequent predicate/argument pairs. R1 has 80 and 170 rules and R2 has 1014 and 3396 rules for Applications 1 and 2 respectively. Some utterances had no predicate (such as customer service please or account balance or the parser was not able to output predicate/argument pairs (No Pred/Arg). The other reasons for classification mistakes are incorrect mapping rules (Error) and absence of mapping rules from predicate/argument pairs to calltypes (No Rule). The absence of a mapping rule was mainly caused by data sparseness and the absence of argument grouping. For example, even though the pair order/pants was in the training data, order/trousers was not. As can be seen from both this table, the performances on ASR transcriptions using these mapping rules are pretty low, mostly due to the lack of robustness of the semantic parser for the ASR errors.

Finally, the inventors employed the proposed iterative approach. The results are provided in Table 5. Even with one iteration, there is a significant jump in the performance, especially for the ASR, since the model has become more robust to ASR errors. With the upper-bound experiment, using an extensive mapping rule set, the inventors achieved around 90% (e.g. 79.7% instead of 88.7%) of the performance to that of the supervised model. Using only a small rule set, this number reduces to only 86.5% on ASR transcriptions.

TABLE 3

The most frequent predicate/argument pairs along with the associated call-types for the retail domain.

| Pred./Arg. pair, p | Arg. Type | Call-type, c | P(p|c) | P(c|p) |
|---|---|---|---|---|
| place/order | Arg1 | Make(Order) | 0.77 | 0.96 |
| make/order | Arg1 | Make(Order) | 0.03 | 0.93 |
| order/something | Arg1 | Make(Order) | 0.02 | 0.86 |
| check/order | Arg1 | Check(Order_Status) | 0.14 | 0.95 |
| cancel/order | Arg1 | Cancel(Order) | 0.07 | 0.95 |
| check/status | Arg1 | Check(Order_Status) | 0.50 | 1.00 |
| talk/someone | Arg2 | Talk(Human) | 0.05 | 0.89 |
| talk/somebody | Arg2 | Talk(Human) | 0.5 | 0.91 |

TABLE 4

Analysis of the call classification results using only the mapping rules using both manual and ASR transcriptions.

| | App. 1 | | | | App. 2 | | | |
|---|---|---|---|---|---|---|---|---|
| | Trans. | | ASR | | Trans. | | ASR | |
| | R1 | R2 | R1 | R2 | R1 | R2 | R1 | R2 |
| Correct | 56.7% | 62.9% | 28.1% | 30.3% | 42.62% | 52.6% | 26.3% | 29.8% |
| No Pred/Arg | 24.0% | 24.0% | 63.0% | 63.0% | 30.9% | 30.9% | 61.4% | 61.4% |
| Error | 3.8% | 6.1% | 1.7% | 3.2% | 6.3% | 12.5% | 2.8% | 6.5% |
| No Rule | 15.5% | 7.0% | 7.2% | 3.5% | 20.2% | 4.0% | 9.5% | 2.3% |

TABLE 5

Call classifications results for the iterative approach using both manual and ASR transcriptions with different rule sets. The best performance for each case is marked with boldface.

| | App. 1 | | | | App. 2 | | | |
|---|---|---|---|---|---|---|---|---|
| | Trans. | | ASR | | Trans. | | ASR | |
| Iteration | R1 | R2 | R1 | R2 | R1 | R2 | R1 | R2 |
| 0 | 56.7% | 62.9% | 28.1% | 30.3% | 42.6% | 52.6% | 26.3% | 29.8% |
| 1 | 76.6% | 79.7% | 71.1% | 75.7% | 66.8% | 70.7% | 63.4% | 66.3% |
| 2 | 74.2% | 78.3% | 71.5% | 74.3% | 67.4% | 70.5% | 64.2% | 66.2% |
| 3 | 74.0% | — | 71.5% | — | 67.6% | — | 64.4% | — |
| SUPERVISED | 88.7% | 88.7% | 82.7% | 82.7% | 81.8% | 81.8% | 74.4% | 74.4% |

Disclosed herein is a semi-supervised spoken language understanding approach depending on semantic role labels in an utterance. Use of this approach using two real-life SDS applications from retail and pharmaceutical domains has been presented. Using a small rule set, with no labeled in-domain data, using both ASR output and human transcriptions, the inventors have achieved the 86.5% of the performance of a model trained with thousands of labeled utterances. With manual transcriptions, ungrammatical fragments and disfluencies cause less problem than expected although the semantic role labeling tool and the underlying part of speech tagger, named entity extractor, and syntactic parser are trained using textual data, mostly newspaper articles. SRL is good at handling the variation in input sentences. This is mostly due to the fact that the utterances are generally short and simple to process. Although semantic parsing suffered from the ASR errors, the iterative approach greatly eliminated this drawback.

The verbs be and have are not marked as predicates in the PropBank corpus. This causes utterances such as I have a billing question to have no predicate. The SLU approach of this invention therefore includes having these verbs as special predicates in order to distinguish them from utterances which do not have a predicate.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
    selecting, via a processor, an intent from a list of predicate/argument pairs associated with a spoken dialog system;
    labeling training data using mapping rules associated with the intent, wherein the mapping rules specify rules for selecting a call-type label for an utterance; and
    while the training data and a classification model associated with the call-type label have a divergence, iteratively:
        training the classification model using the training data; and
        re-labeling the training data using the classification model.

2. The method of claim 1, further comprising assigning the verbs "be" and "have" as special predicates.

3. The method of claim 1, further comprising distinguishing verbs from utterances which do not have a predicate by assigning the verbs to a special class.

4. The method of claim 1, wherein the method is semi-supervised.

5. The method of claim 1, further comprising capturing infrequent call types using an active-learning approach.

6. The method of claim 1, wherein the selecting of the intent is performed independent of a domain.

7. The method of claim 1, wherein the mapping rules specify that the call-type is represented by multiple predicate/argument pairs.

8. A system comprising:
    a processor; and
    a computer-readable storage medium having instructions stored which, when executed by the processor, perform operations comprising:
        selecting an intent from a list of predicate/argument pairs associated with a spoken dialog system;
        labeling training data using mapping rules associated with the intent, wherein the mapping rules specify rules for selecting a call-type label for an utterance; and
        while the training data and a classification model associated with the call-type label have a divergence, iteratively:
            training the classification model using the training data; and
            re-labeling the training data using the classification model.

9. The system of claim 8, the computer-readable storage medium having additional instructions stored which result in the operations further comprising assigning the verbs "be" and "have" as special predicates.

10. The system of claim 8, the computer-readable storage medium having additional instructions stored which result in the operations further comprising distinguishing verbs from utterances which do not have a predicate by assigning the verbs to a special class.

11. The system of claim 8, wherein the operations are semi-supervised.

12. The system of claim 8, the computer-readable storage medium having additional instructions stored which result in the operations further comprising capturing infrequent call types using an active-learning approach.

13. The system of claim 8, wherein the selecting of the intent is performed independent of a domain.

14. The system of claim 8, wherein the mapping rules specify that the call-type is represented by multiple predicate/argument pairs.

15. A computer-readable storage medium having instructions stored which, when executed by a computing device, cause the computing device to perform operations comprising:
- selecting an intent from a list of predicate/argument pairs associated with a spoken dialog system;
- labeling training data using mapping rules associated with the intent, wherein the mapping rules specify rules for selecting a call-type label for an utterance; and
- while the training data and a classification model associated with the call-type label have a divergence, iteratively:
  - training the classification model using the training data; and
  - re-labeling the training data using the classification model.

16. The computer-readable storage medium of claim 15, the computer-readable storage medium having additional instructions stored which result in the operations further comprising assigning the verbs "be" and "have" as special predicates.

17. The computer-readable storage medium of claim 15, the computer-readable storage medium having additional instructions stored which result in the operations further comprising distinguishing verbs from utterances which do not have a predicate by assigning the verbs to a special class.

18. The computer-readable storage medium of claim 15, wherein the operations are semi-supervised.

19. The computer-readable storage medium of claim 15, the computer-readable storage medium having additional instructions stored which result in the operations further comprising capturing infrequent call types using an active-learning approach.

20. The computer-readable storage medium of claim 15, wherein the selecting of the intent is performed independent of a domain.

* * * * *